(12) United States Patent
Pfau

(10) Patent No.: US 12,448,075 B2
(45) Date of Patent: Oct. 21, 2025

(54) CONTROLLER AND CONTROL METHOD FOR RIDER ASSISTANCE SYSTEM

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 242 days.

(21) Appl. No.: 18/257,514

(22) PCT Filed: Dec. 16, 2021

(86) PCT No.: PCT/IB2021/061811
§ 371 (c)(1),
(2) Date: Jun. 14, 2023

(87) PCT Pub. No.: WO2022/137034
PCT Pub. Date: Jun. 30, 2022

(65) Prior Publication Data
US 2024/0034428 A1 Feb. 1, 2024

(30) Foreign Application Priority Data

Dec. 23, 2020 (JP) ................. 2020-214072

(51) Int. Cl.
*B62J 50/00* (2020.01)
*B62J 50/22* (2020.01)

(52) U.S. Cl.
CPC .................... *B62J 50/22* (2020.02)

(58) Field of Classification Search
CPC ... B62J 50/22; B62J 45/41; B62J 50/20; B62J 27/00; B62J 45/4151; B62J 50/00;
(Continued)

(56) References Cited

U.S. PATENT DOCUMENTS

2021/0188270 A1* 6/2021 Horn .................. B62J 45/20

FOREIGN PATENT DOCUMENTS

| EP | 1989086 B1 | 5/2015 |
| EP | 3723065 A1 | 10/2020 |

(Continued)

OTHER PUBLICATIONS

International Search Report and Written Opinion for Application No. PCT/IB2021/061811 dated Mar. 11, 2022 (12 pages).

*Primary Examiner* — Shardul D Patel
(74) *Attorney, Agent, or Firm* — Michael Best & Friedrich LLP

(57) ABSTRACT

A controller and a control method assists a rider of a lean vehicle. An acquisition section of a controller acquires environment information about an environment around the lean vehicle in response to an output from an environment detector mounted to the lean vehicle or via a wireless communication with another vehicle or an infrastructure equipment. The execution section executes a driving assistance operation for the rider according to the environment information. The acquisition section acquires a reference clearance information by using a posture information of the lean vehicle. The reference clearance information is information about a reference clearance that is a reference used in a determination whether there is a space through which the lean vehicle slips or a determination whether it is safe for the lean vehicle to slip through. The execution section executes the driving assistance operation based on the reference clearance information.

14 Claims, 5 Drawing Sheets

(58) Field of Classification Search
CPC .......... B60W 30/143; B60W 2300/36; B60W 2520/14; B60W 2520/18; B60W 2530/201; B60W 2554/801; B60W 2720/10; B60W 2754/20; H04W 4/40; G08G 1/09675; G08G 1/096783; G08G 1/096791; G08G 1/162; G08G 1/165; G08G 1/166; G08G 1/096725
USPC .......................................................... 701/36
See application file for complete search history.

(56) References Cited

FOREIGN PATENT DOCUMENTS

| | | |
|---|---|---|
| JP | 2009023485 A | 2/2009 |
| JP | 2009116882 A | 5/2009 |
| WO | 2017030131 A1 | 2/2017 |
| WO | 2020012900 A1 | 1/2020 |

* cited by examiner

[FIG. 3]
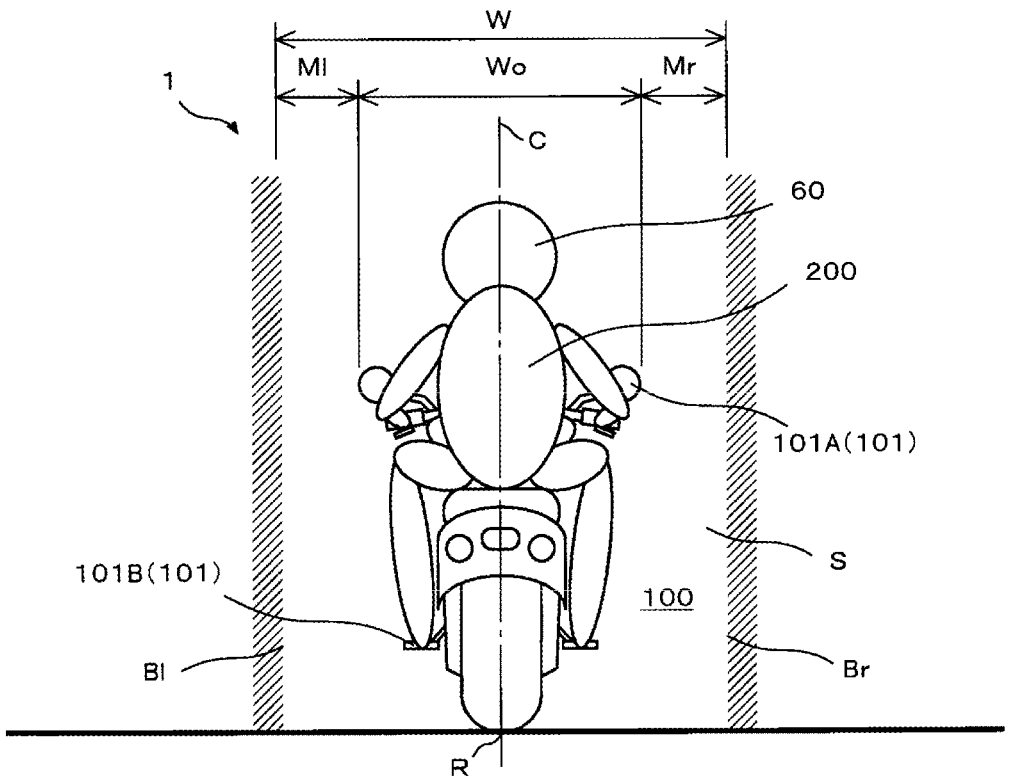
[FIG. 4]
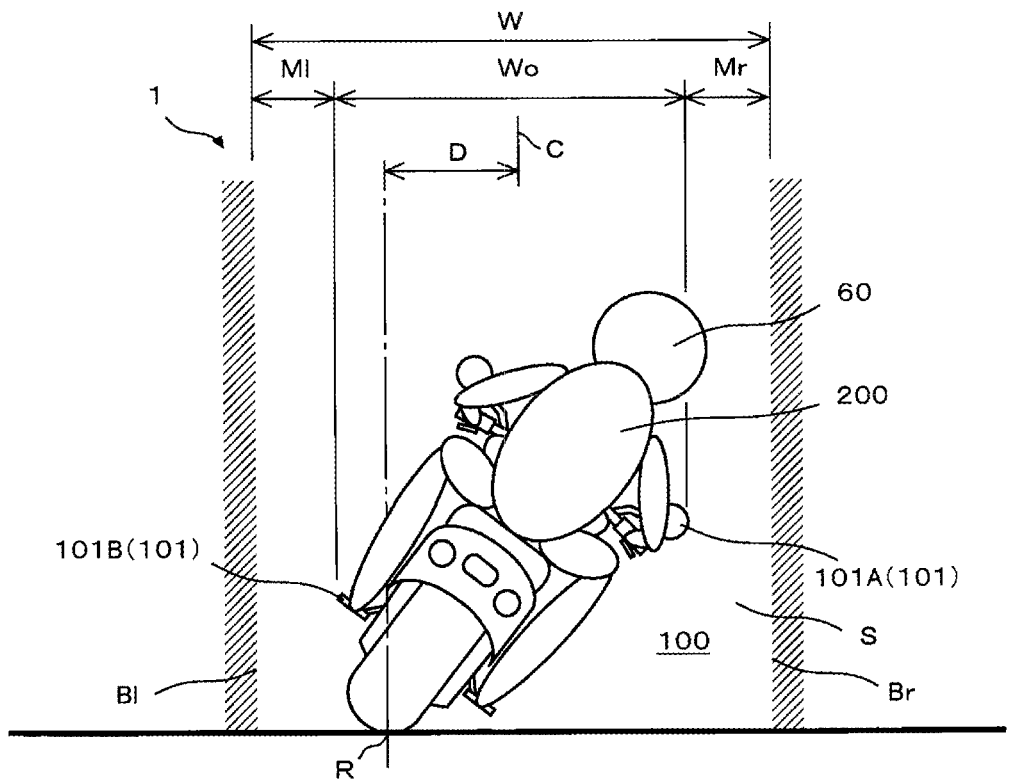

[FIG. 5]
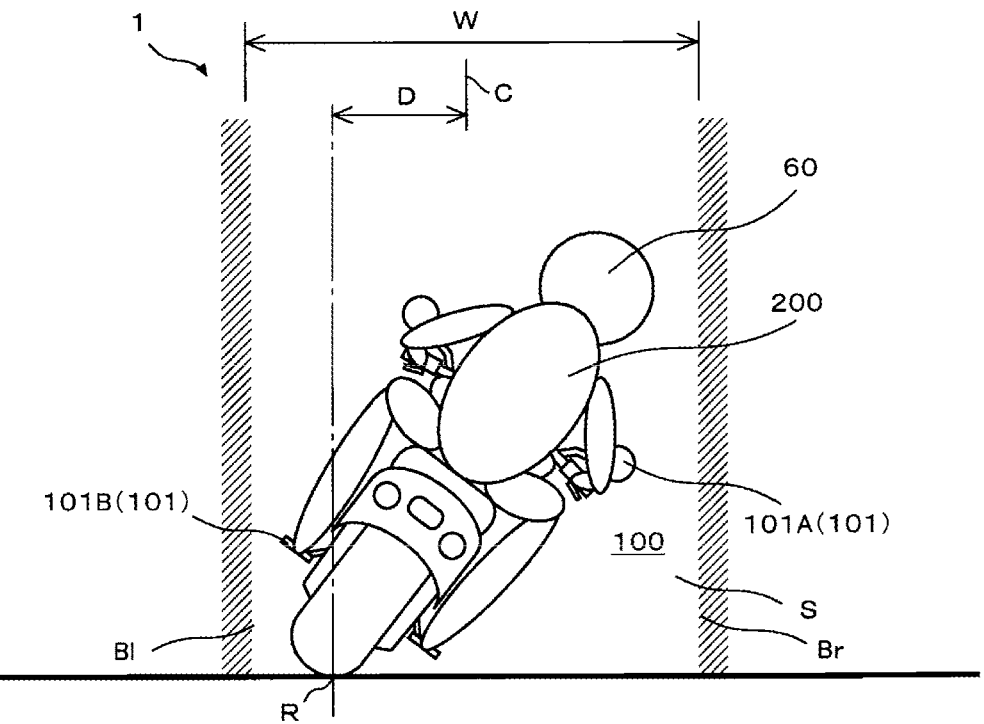
[FIG. 6]
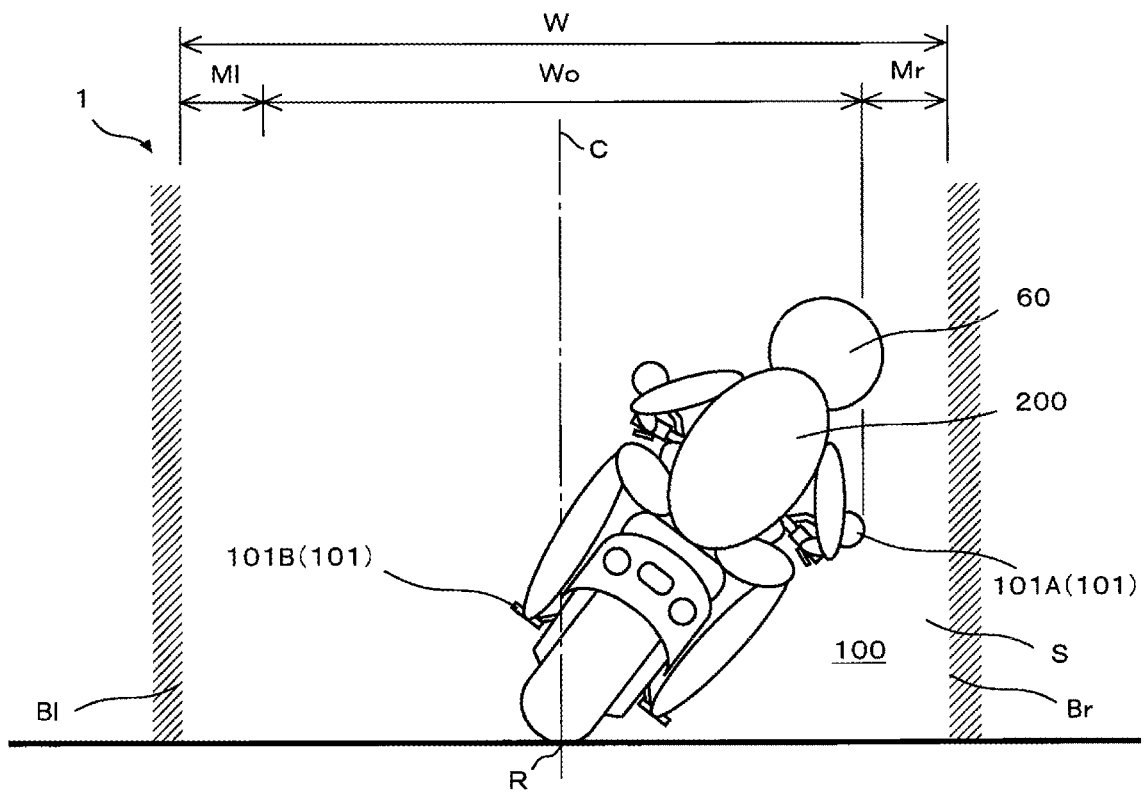

[FIG. 7]
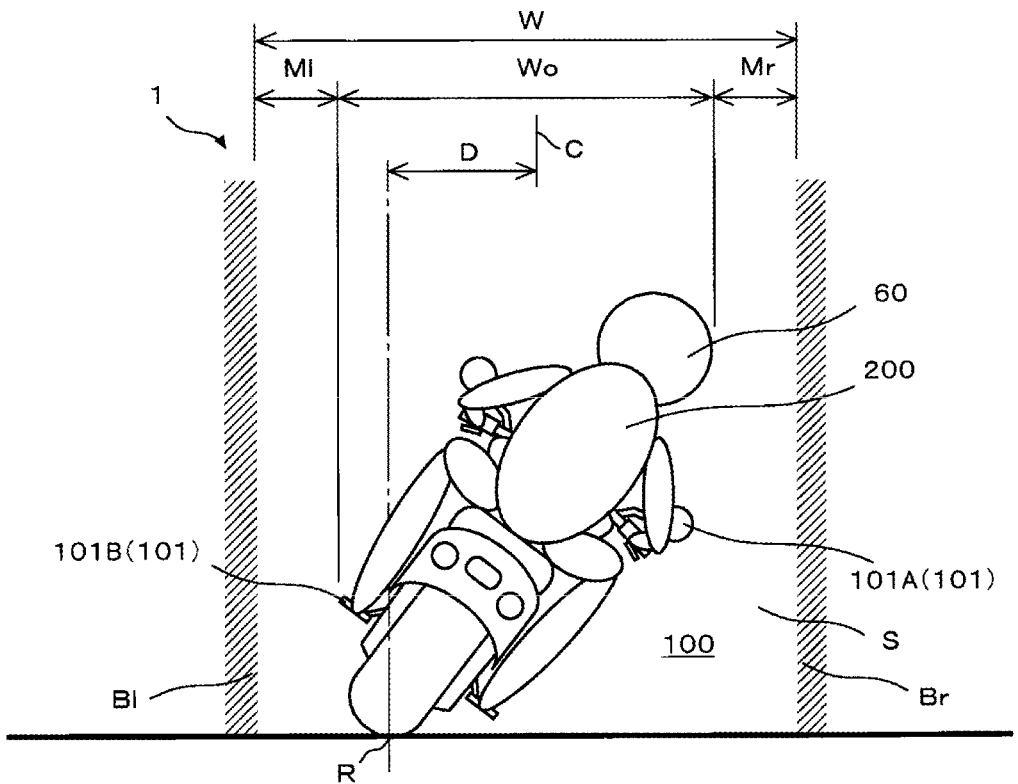
[FIG. 8]
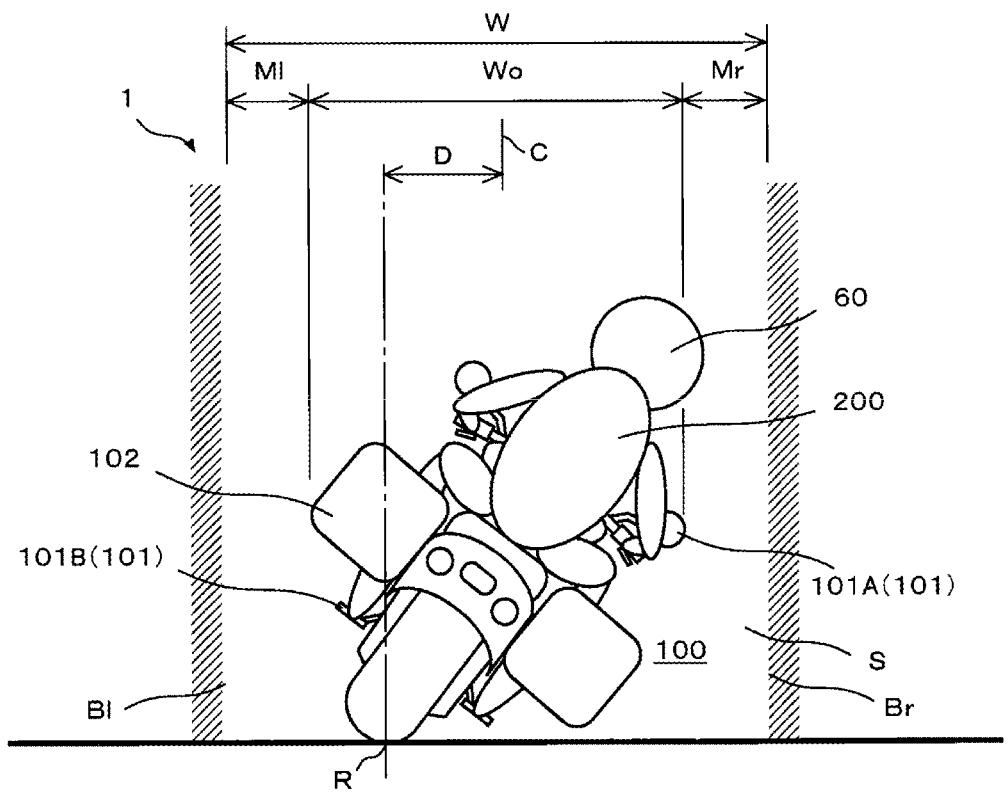

CONTROLLER AND CONTROL METHOD FOR RIDER ASSISTANCE SYSTEM

BACKGROUND

The present disclosure relates to a controller for a rider assistance system that assists a rider of a lean vehicle in driving the lean vehicle. The present disclosure relates to a control method for a rider assistance system that assists a rider of a lean vehicle in driving the lean vehicle.

Rider assistance systems are known to execute a driving assistance operation for a rider according to information about surrounding environment. JP2009-116882A discloses such a rider assistance system.

A lean vehicle may act in a different way as compared to other vehicles (e.g., a passenger vehicle or a truck). For example, when a lean vehicle turns a curve, a body of the lean vehicle leans greatly in a turning direction. As such, a space occupied by the lean vehicle varies greatly according to postures of the lean vehicle. However, conventional rider assistance systems do not consider the change in the space. Therefore, conventional rider assistance systems may not be able to execute rider assistance operations appropriately.

SUMMARY

The present disclosure addresses the above-described issues. Thus, it is an objective of the present disclosure to provide a controller that appropriately assists a rider of a lean vehicle in driving the lean vehicle. It is another objective of the present disclosure to provide a control method that appropriately assists a rider of a lean vehicle in driving the lean vehicle.

As one aspect of the present disclosure, a controller for a rider assistance system assists a rider of a lean vehicle in driving the lean vehicle. The controller has an acquisition section and an execution section. The acquisition section is configured to acquire an environment information about an environment around the lean vehicle. The acquisition section is configured to acquire the environment information in response to an output from an environment detector mounted to the lean vehicle or via a wireless communication with another vehicle or an infrastructure equipment. The execution section is configured to execute a driving assistance operation for the rider according to the environment information. The acquisition section is configured to acquire a reference clearance information by using a posture information that is information about a posture of the lean vehicle. The reference clearance information is information about a reference clearance that is a reference used in a determination whether there is a space through which the lean vehicle slips or a determination whether it is safe for the lean vehicle to slip through. The execution section is configured to execute the driving assistance operation based on the reference clearance information.

As one aspect of the present disclosure, a control method for a rider assistance system assists a rider of a lean vehicle in driving the lean vehicle. The control method includes: acquiring, by an acquiring section, an environment information about an environment around the lean vehicle in response to an output from an environment detector mounted to the lean vehicle or via a wireless communication with another vehicle or an infrastructure equipment; and executing, by an execution section, a driving assistance operation for the rider according to the environment information. In acquiring the environment information, the acquisition section acquires a reference clearance information by using a posture information that is information about a posture of the lean vehicle. The reference clearance information is information about a reference clearance that is a reference used in a determination whether there is a space through which the lean vehicle slips or a determination whether it is safe for the lean vehicle to slip through. In executing the driving assistance operation, the execution section executes the driving assistance operation based on the reference clearance information.

According to the present disclosure, the reference clearance information is acquired based on the posture information of the lean vehicle, and the driving assistance operation is executed based on the reference clearance information. As such, even if the lean vehicle changes its posture while traveling and the change in posture results in a change in space occupied by the lean vehicle, the change in space can be reflected to the driving assistance operation. Thus, the driving assistance operation can be executed appropriately to assist the rider in driving the lean vehicle.

BRIEF DESCRIPTION OF THE DRAWINGS

FIG. 3 is a view from behind of the lean vehicle and illustrating a reference clearance information regarding the lean vehicle that is traveling upright.

FIG. 4 is a view from behind of the lean vehicle and illustrating a reference clearance information regarding the lean vehicle that is traveling with a tilted posture, according to one embodiment.

FIG. 5 is a view from behind of the lean vehicle and illustrating a reference clearance information regarding the lean vehicle that is traveling with a tilted posture, according to another embodiment.

FIG. 6 is a view from behind of the lean vehicle and illustrating a reference clearance information regarding the lean vehicle that is traveling with a tilted posture, according to another embodiment.

FIG. 7 is a view from behind of the lean vehicle and illustrating a reference clearance information regarding the lean vehicle that is traveling with a tilted posture, according to another embodiment.

FIG. 8 is a view from behind of the lean vehicle and illustrating a reference clearance information regarding the lean vehicle that is traveling with a tilted posture, according to another embodiment.

DETAILED DESCRIPTION

Figure 1:
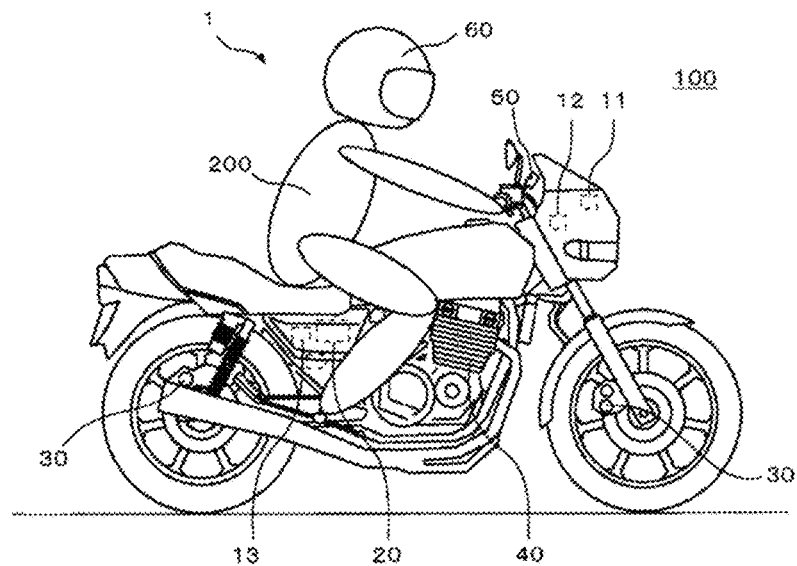
FIG. 1 is a view illustrating a rider assistance system that is mounted to a lean vehicle according to one embodiment.

A controller and a control method according to the present disclosure will be described hereinafter with reference to the drawings.

It should be understood that configurations or operations described hereafter are examples. A controller and a control method according to the present disclosure are not limited to such examples.

The present disclosure will be described hereafter as a controller and a control method are applied to two-wheel vehicles. However, a controller and a control method according to the present disclosure may be applied to lean vehicles other than two-wheel vehicles. A lean vehicle includes any vehicles that leans in a turning direction when the vehicle turns. For example, a lean vehicle may be a two-wheel motorcycle, a three-wheel motorcycle, or a bicycle. For example, a motorcycle may be a vehicle that travels with power generated by an engine, a vehicle that travels with power generated by an electric motor. A motorcycle may be a motorbike, a scooter, or an electric scooter. A bicycle may be any vehicles that travels with power generated by a rider in a manner that the rider steps on a pedal. A bicycle may be a regular bicycle, a power-assisted bicycle, or an electric bicycle.

In the detailed description below, redundant explanations will be simplified or omitted for the same or similar configurations. In the drawings, the same or similar parts may be assigned with the same reference numbers or the reference numbers may be omitted. Small parts may be illustrated simply or illustration thereof may be omitted in the drawings.

A rider assistance system according to one embodiment will be described hereafter.

Configuration of Rider Assistance System

A description will be made on a configuration of the rider assistance system according to the embodiment.

Figure 2:
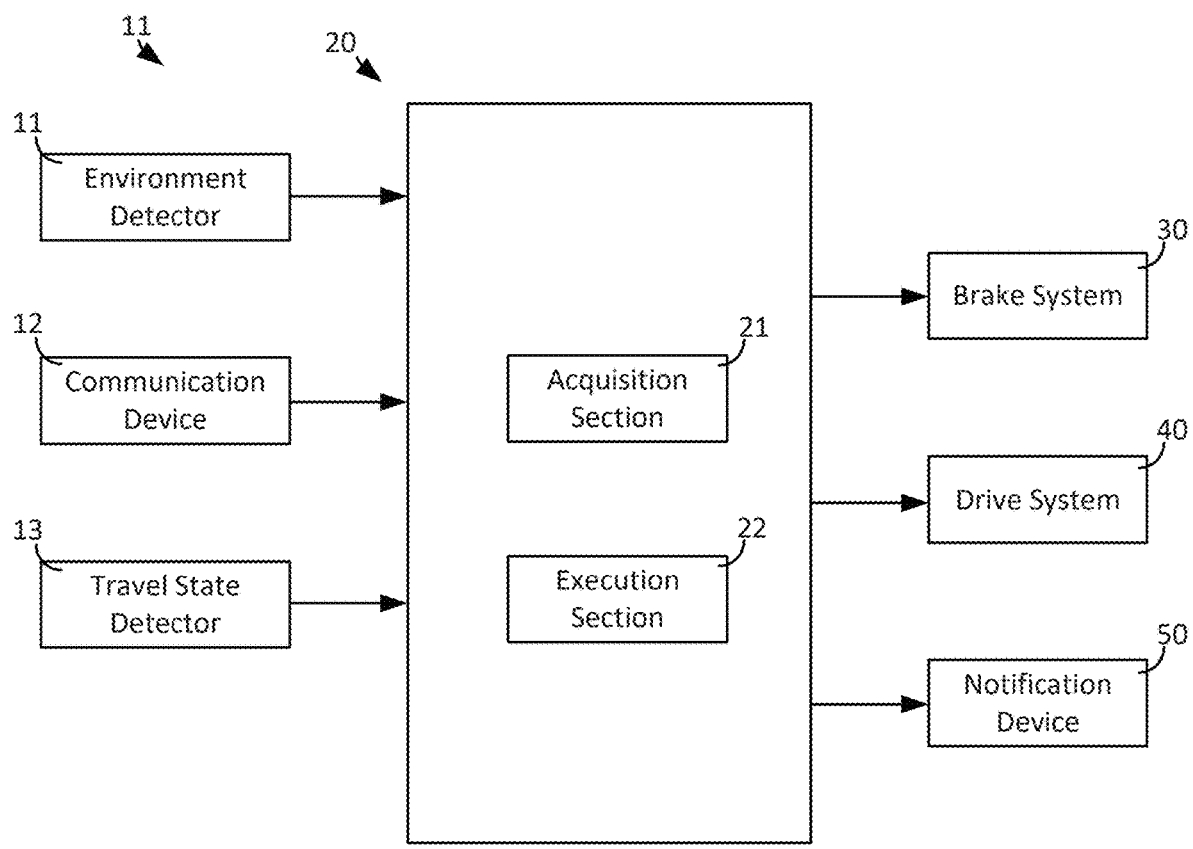
FIG. 2 is a diagram illustrating a system configuration of the rider assistance system according to one embodiment.

FIG. 1 is a view illustrating a mounted state of the rider assistance system according to the embodiment of the present disclosure to a lean vehicle. FIG. 2 is a diagram illustrating a system configuration of the rider assistance system according to the embodiment of the present disclosure.

As illustrated in FIG. 1 and FIG. 2, a rider assistance system 1 includes an environment detector 11 (or a surrounding environment detector), a communication device 12, a travel state detector 13, and a controller (i.e., ECU) 20. The environment detector 11 detects an environment information that is information about environment around a lean vehicle 100. The communication device 12 receives, via wireless communication, the environment information from another vehicle or an infrastructure equipment. The travel state detector 13 detects a travel state information that is information about how the lean vehicle 100 travels. The rider assistance system 1 assists a rider 200 of the lean vehicle 100 in driving the lean vehicle 100 by using the environment information. The controller 20 receives signals from various detectors (not illustrated). The various detectors output various information. The various information may include information about braking operated by the rider 200 or information about acceleration operated by the rider 200. Each section/component in the rider assistance system 1 may exclusively be used for the rider assistance system 1, or may be shared with another system. The environment detector 11 or the communication device 12 may be omitted.

Examples of the environment detector 11 are a radar, a Lidar sensor, an ultrasonic sensor, and a camera. The environment detector 11 is provided to a front portion of the lean vehicle 100, and a detection range thereof is preferably directed to a front side of the lean vehicle 100. In addition to the environment detector 11, another environment detector (i.e., surrounding environment detector) may be provided to a rear potion or a lateral portion of the lean vehicle 100, and a detection range thereof may be directed to a rear side or a lateral side of the lean vehicle 100. For example, the environment detector 11 detects information about a relative positional relationship between the lean vehicle 100 and a target (for example, another vehicle, an obstacle, a person, or an animal) located within the detection range, information about a relative positional relationship between the targets (for example, the other vehicle, the obstacle, the person, or the animal) located within the detection range, or the like, and outputs such information to the controller 20. Examples of the information about the relative positional relationship can be relative distance information, relative speed information, relative acceleration information, and relative jerk information.

The communication device 12 receives the environment information, which is sent from the other vehicle or the infrastructure equipment, either directly or indirectly via another device (for example, an Internet server, a portable wireless terminal, or a worn article 60 of the rider 200). The worn articles 60 include a helmet, a glove, and the like. The environment information that is sent from the other vehicle may be an environment information acquired by the other vehicle or state information of the other vehicle itself. Meanwhile, the environment information that is sent from the infrastructure equipment may be an environment information acquired by the infrastructure equipment or state information of the infrastructure equipment itself. For example, the communication device 12 receives the information about the relative positional relationship between the lean vehicle 100 and the target (for example, the other vehicle, the obstacle, the person, or the animal), the information about the relative positional relationship between the targets (for example, the other vehicle, the obstacle, the person, or the animal), or the like, and outputs such information to the controller 20. The examples of the information about the relative positional relationship can be the relative distance information, the relative speed information, the relative acceleration information, and the relative jerk information.

For example, the travel state detector 13 includes a vehicle speed sensor and an inertia sensor (IMU). The vehicle speed sensor detects a vehicle speed generated on the lean vehicle 100. The inertia sensor detects a three-axis acceleration and three-axis (roll, pitch, and yaw) angular velocities generated on the lean vehicle 100. The travel state detector 13 may detect other physical quantities that can substantially be converted to the vehicle speed generated on the lean vehicle 100, the three-axis acceleration generated on the lean vehicle 100, and the three-axis angular velocities generated on the lean vehicle 100. Alternatively, the inertia sensor may partially detect the three-axis acceleration and the three-axis angular velocities. Further alternatively, when necessary, at least one of the vehicle speed sensor and the inertia sensor may not be provided, or another sensor may be added.

A controller 20 includes an acquisition section 21 and an execution section 22. The controller 20, partially or entirely, may be housed in a single housing. Alternatively, the controller may include separate sections housed in separate housings respectively. The controller 20, partially or entirely, may be formed of a microcomputer or a microprocessor unit, may be formed of an updatable part such as a firmware, or may be formed of a program module that is executed in response to a command signal from a CPU.

The acquisition section 21 acquires the environment information of the lean vehicle 100 based on an output from the environment detector 11 or based on the wireless communication with the other vehicle or the infrastructure equipment. Then, for example, the execution section 22 outputs a control command to a brake system 30 that generates a braking force on the lean vehicle 100, a drive system 40 that generates drive power on the lean vehicle 100, a notification device 50 that issues a warning (for example, a warning that acts on an auditory organ, a warning that acts on a visual organ, or a warning that acts on a sensory organ) or the like, and executes various types of driving assistance operation for the rider 200 according to the environment information. The notification device 50 may be provided to the lean vehicle 100 or may be provided to the worn article 60 of the rider 200 of the lean vehicle 100. In addition, the warning to the rider 200 may be issued by haptic motion that causes an instantaneous reduction or increase in the acceleration of the lean vehicle 100. In such a case, the brake system 30 or the drive system implements the function of the notification device 50.

FIG. 3 is a view from behind of the lean vehicle and illustrating a reference clearance information regarding the lean vehicle that is traveling upright. FIG. 4 is a view from behind of the lean vehicle and illustrating a reference clearance information regarding the lean vehicle that is traveling with a tilted posture, according to one embodiment.

Here, the acquisition section 21 acquires a posture information (i.e., a travel posture information) that is information about a posture of the lean vehicle 100 while traveling. Specifically, the acquisition section 21 acquires the posture information based on an output from the travel state detector 13. The acquisition section 21 further acquires a reference clearance information based on the posture information. The reference clearance information is information about a reference clearance S that is used in a determination whether the lean vehicle 100 can slip through a clearance or in a determination whether it is safe for the lean vehicle 100 to slip through a clearance. That is, the reference clearance S is defined as a minimum clearance to be secured for allowing the lean vehicle 100 to slip through. Alternatively, the reference clearance S is defined as a clearance to be secured for allowing the lean vehicle 100 to travel safely. For example, the acquisition section 21 acquires a width W and a displacement amount D as the reference clearance information. The width W is a width of the reference clearance S along a direction parallel to a road surface. The displacement amount D is a distance (or a gap) between a lateral center C (i.e., a width center) of the reference clearance S and a reference point R of the lean vehicle 100 along the direction parallel to the road surface. In FIG. 3 and FIG. 4, the reference point R is defined as a contact point where the lean vehicle 100 is in contact with the ground. However, the reference point R may be defined as a center of gravity of the lean vehicle 100. As another example, the reference point R may be defined as a location where the environment detector 11 is attached to the lean vehicle 100.

More specifically, as illustrated in FIG. 3, in a state where the lean vehicle 100 travels upright, the width W is a clearance between a right boundary Br and a left boundary Bl. In other words, the width W is a width of a road surface occupied by the lean vehicle 100. In other words, the width W is a width that is acquired by adding a right margin Mr and a left margin Ml to an effective vehicle width Wo that is a maximum vehicle width of the lean vehicle 100 along the direction parallel to the road surface. Along the direction parallel to the road surface, there is no gap between the reference point R and the lateral center C of the reference clearance S when the lean vehicle 100 is upright. The effective vehicle width Wo is stored, e.g., in a memory, in advance as a unique value to the lean vehicle 100. The lean vehicle 100 may have a protrusion 101 that protrudes from the lean vehicle 100 laterally. The protrusion 101 may be a mirror 101A, a pedal or step 101B, or a muffler. As such, the effective vehicle width Wo may preferably be set considering a dimensional information that is information about a location and/or a shape of the protrusion 101. Each of the right margin Mr and the left margin Ml may be a constant value, may be a variable value that is manually set by the rider 200, or may be a variable value that is automatically set by the acquisition section 21. The acquisition section 21 may change each of the right margin Mr and the left margin Ml according to the travel state information of the lean vehicle 100. For example, the travel state information may be a travel speed of the lean vehicle 100 or the acceleration generated in the lean vehicle 100. The right margin Mr and the left margin Ml may be equal to each other or may be different from each other. Alternatively, the width W of the reference clearance S may be calculated as the effective vehicle width Wo without adding the right margin Mr and the left margin Ml.

As illustrated in FIG. 4, when the lean vehicle 100 is leaning, the width of the road surface occupied by the lean vehicle 100 becomes greater as compared to a situation where the lean vehicle 100 is upright. In other words, when the lean vehicle 100 is leaning, the effective vehicle width Wo, which is a maximum vehicle width of the lean vehicle 100 along the direction parallel to the road surface, becomes greater as compared to a situation where the lean vehicle 100 is upright. Accordingly, the width W, i.e., the clearance between the right boundary Br and the left boundary Bl, becomes greater as compared to the situation where the lean vehicle 100 is upright. In addition, the lateral center C of the reference clearance S shifts in a leaning direction of the lean vehicle 100 as compared to the situation where the lean vehicle 100 is upright. Thus, the displacement amount D is caused between the reference point R and the lateral center C along the direction parallel to the road surface. The acquisition section 21 sets the effective vehicle width Wo and the displacement amount D based on the posture information, i.e., information that provides a degree of leaning of the lean vehicle 100. For example, the acquisition section 21 is able to obtain the degree of leaning of the lean vehicle 100 based on information about a roll angle generated to the lean vehicle 100, information about a steering angle generated to the lean vehicle 100, information about a yaw rate generated to the lean vehicle 100, or map information. Preferably, the degree of leaning may be calculated considering the dimensional information (e.g., a location and/or a shape) of the protrusion 101 of the lean vehicle 100. The acquisition section 21 may continuously change or intermittently change the effective vehicle width Wo and the displacement amount D according to the posture information of the lean vehicle 100. A relationship between the posture information of the lean vehicle 100 and each of the effective vehicle width Wo and the displacement amount D may be stored as a table. The acquisition section 21 may change the right margin Mr and the left margin Ml according to the posture information. For example, the acquisition section 21 increases the right margin Mr and the left margin Ml as the degree of leaning of the lean vehicle 100 increases.

FIG. 5 to FIG. 9 are views from behind of the lean vehicle and illustrating a reference clearance information regarding the lean vehicle that is traveling with a tilted posture, according to variants.

According to the above-described example, both of the width W and a locational relationship between the reference point R and the lateral center C change when the lean vehicle 100 is leaning. However, as illustrated in FIG. 5 and FIG. 6, in regard to the reference clearance information acquired by the acquisition section 21, only one of those may be changed when the lean vehicle 100 is leaning. That is, as illustrated in FIG. 5, in regard to the reference clearance information, the width W of the reference clearance S is not changed but the displacement amount D between the reference point R and the lateral center C is caused when the lean vehicle 100 leans. Alternatively, as illustrated in FIG. 6, in regard to the reference clearance information, the displacement amount D is not caused between the reference point R and the lateral center C but the width W is increased when the lean vehicle 100 leans.

As illustrated in FIG. 7, the reference clearance information may be acquired based on occupant information of the lean vehicle 100. That is, the acquisition section 21 may calculate the effective vehicle width Wo by adding a protruding amount of an occupant to the maximum vehicle width of the lean vehicle 100 along the direction parallel to the road surface. The protruding amount of an occupant may be a protruding amount of a head of an occupant (at least one of the rider 200 and a passenger) protruding from the lean vehicle 100 along the direction parallel to the road surface. The occupant information may be a fixed value based on an assumption that the occupant has a standard body frame, may be a variable that is manually set by the rider 200, or may be a variable that is automatically set by the acquisition section 21. Furthermore, information about the worn article 60 (e.g., a shape and/or a location of the worn article 60) of the rider 200 or about a worn article of the passenger may be added to the occupant information.

As illustrated in FIG. 8, the reference clearance information may be acquired based on a load information (i.e., a loading-article information) that is information about a loading article on the lean vehicle 100. That is, the acquisition section 21 may calculate the effective vehicle width Wo by adding a protruding amount of a loaded article 102 (for example, a side case or a baggage) to the maximum vehicle width of the lean vehicle 100 along the direction parallel to the road surface. The protruding amount is a protruding amount of the loaded article 102 protruding from the lean vehicle 100 along the direction parallel to the road surface. The load information may be a fixed value based on an assumption that the standard loaded article 102 is loaded, may be a variable that is manually set by the rider 200, or may be a variable that is automatically set by the acquisition section 21.

Figure 9:
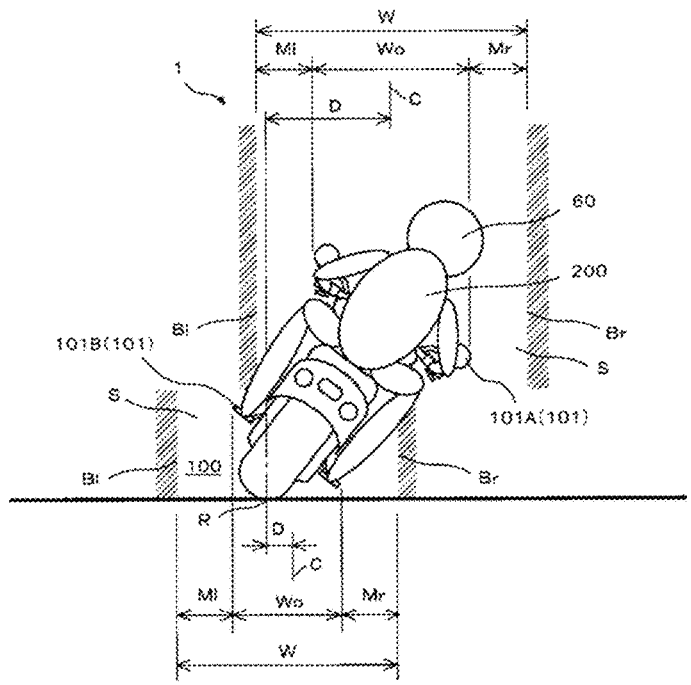
FIG. 9 is a view from behind of the lean vehicle and illustrating a reference clearance information regarding the lean vehicle that is traveling with a tilted posture, according to another embodiment.

As illustrated in FIG. 9, in regard to the reference clearance information, the width W of the reference clearance S may vary depending on a height. The positional relationship between the reference point R and the lateral center C of the reference clearance S along the direction parallel to the road surface may vary depending on a height. Each of the width W of the reference clearance S and the positional relationship between the reference point R and the lateral center C may vary continuously depending on a height or may vary intermittently depending on a height.

The execution section 22 executes the driving assistance operation based on the reference clearance information acquired by the acquisition section 21.

As an example, the execution section 22 executes, as the driving assistance operation, an adaptive cruise control operation in the lean vehicle 100. In cruise control operation, the controller 20 controls the brake system 30 and the drive system 40 such that the lean vehicle 100 travels at a target speed that is set by the rider 200. In the adaptive cruise control operation, in addition to the control of the cruise control operation, the lean vehicle 100 is maneuvered to keep a distance between the lean vehicle 100 and a preceding vehicle (i.e., a target vehicle to follow) or to keep avoiding a collision with the preceding vehicle. That is, when there is no target vehicle to follow in the adaptive cruise control operation, the controller 20 controls the brake system 30 and the drive system 40 to maneuver the lean vehicle 100 to travel at the target speed set by the rider 200. On the other hand, when there is a target vehicle to follow in the adaptive cruise control operation, the controller 20 controls the brake system 30 and the drive system 40 to maneuver the lean vehicle 100 so that the lean vehicle 100 travels at a speed which is slower than the target speed and which allows the lean vehicle 100 to keep the distance between the target vehicle and the lean vehicle 100 or to keep avoiding a collision with the target vehicle. For controlling a speed of the lean vehicle 100 in such a manner, the execution section 22 detects the target vehicle based on the reference clearance information.

For example, the execution section 22 can estimate a future traveling path of the lean vehicle 100 based on the posture information of the lean vehicle 100. In a case where two preceding vehicles are traveling in front of the lean vehicle 100 and the future traveling path is located between the two preceding vehicles, the execution section 22 does not set the two preceding vehicles as the target vehicle to follow when an actual distance between the two preceding vehicles is larger than the width W of the reference clearance S. On the other hand, when the distance between the two preceding vehicles is smaller than the width W of the reference clearance S, the execution section 22 selects one of the two preceding vehicles located closer to the lean vehicle 100 and sets the one of the two preceding vehicles as the target vehicle to follow. Preferably, the target vehicle is set considering a position information about where the actual clearance between the two preceding vehicles is located and a position information about where the reference clearance S is located. The position information about the location of the reference clearance S may be a location of the lateral center C, a location of the right boundary Br, and/or a location of the left boundary Bl.

For example, based on a presumption that the lean vehicle 100 on the estimated traveling path arrives at the actual clearance, the execution section 22 sets the target vehicle by predicting whether the right boundary Br and the left boundary Bl at a time point of the arrival are located inside the actual clearance.

For example, the execution section 22 estimates the future traveling path of the lean vehicle 100 based on the posture information of the lean vehicle 100 and identifies the preceding vehicle that is located on the estimated traveling path. The execution section 22 further estimates a plurality of reference points R located on the estimated traveling path and defines a plurality of reference clearances S corresponding to the plurality of reference points R to cover an entire area between the lean vehicle 100 and the preceding vehicle. Then, the execution section 22 sets the preceding vehicle as the target vehicle to follow when there is no vehicle other than the preceding vehicle inside any one of the reference clearances S.

As an example, the execution section 22 receives the reference clearance information and an actual clearance information about an actual clearance located on the traveling path of the lean vehicle 100. Based on the reference clearance information and the actual clearance information, the execution section 22 determines whether the actual clearance allows the lean vehicle 100 to pass therethrough or whether it is safe for the lean vehicle 100 to pass through the actual clearance. Then, the execution section 22 executes the driving assistance operation based on the determination result. The actual clearance may be a clearance between an obstacle and a vehicle, a clearance between two obstacles distanced from each other, or a clearance between two vehicles distanced from each other. For example, the obstacle is a utility pole, a guardrail, a curbstone, a fallen object, and the like. In addition, instead of the obstacle or the vehicle, a distance between a person and an animal may be detected as the clearance. The vehicle is not limited to be traveling and may be stopped.

For example, in the case where the actual clearance information is information indicating that the width of the actual clearance is less than the width W of the reference clearance S in the reference clearance information, the execution section 22 outputs a control signal to the brake system 30 or the drive system 40, so as to execute the driving assistance operation for automatically decelerating the lean vehicle 100. For such a determination, the position information of the actual clearance and the position information of the reference clearance S in the reference clearance information (for example, the position of the lateral center C, the position of the right boundary Br, the position of the left boundary Bl, and the like) are preferably taken into consideration. For example, based on a presumption that the lean vehicle 100 arrives at the actual clearance along the estimated traveling path, the execution section 22 predicts whether the right boundary Br and the left boundary Bl at the time point of the arrival are located inside the actual clearance. In this way, the execution section 22 determines the possibility or the impossibility of the slip-by travel of the lean vehicle 100 through the actual clearance or the safety of such slip-by travel.

For example, in the case where the actual clearance information is the information indicating that the width of the actual clearance is less than the width W of the reference clearance S in the reference clearance information, the execution section 22 outputs the control signal to the notification device 50, so as to execute the driving assistance operation for warning the rider 200 of the lean vehicle 100. For such a determination, the position information of the actual clearance and the position information of the reference clearance S in the reference clearance information (for example, the position of the lateral center C, the position of the right boundary Br, the position of the left boundary Bl, and the like) are preferably taken into consideration. For example, based on the presumption that the lean vehicle 100 arrives at the actual clearance along the estimated traveling path, the execution section 22 predicts whether the right boundary Br and the left boundary Bl at the time point of the arrival are located inside the actual clearance. In this way, the execution section 22 determines the possibility or the impossibility of the slip-by travel of the lean vehicle 100 through the actual clearance or the safety of such slip-by travel. Here, the notification device 50 may warn another vehicle traveling around the lean vehicle 100, in addition to or instead of the rider 200. The warning may be given by controlling a sound generator (for example, a horn or a speaker) of the lean vehicle 100 or the worn article 60, may be given by controlling a light emitter (for example, a headlamp or a turn signal) of the lean vehicle 100 or the worn article 60, or may be given by sending a wireless signal from the lean vehicle 100 to another vehicle.

For example, in the case where the actual clearance information is the information indicating that the width of the actual clearance is less than the width W of the reference clearance S in the reference clearance information, the execution section 22 executes the driving assistance operation to cancel the cruise control operation or the adaptive cruise control operation, which is currently executed in the lean vehicle 100. For such a determination, the position information of the actual clearance and the position information of the reference clearance S in the reference clearance information (for example, the position of the lateral center C, the position of the right boundary Br, the position of the left boundary Bl, and the like) are preferably taken into consideration. For example, based on the presumption that the lean vehicle 100 arrives at the actual clearance along the estimated traveling path, the execution section 22 predicts whether the right boundary Br and the left boundary Bl at the time point of the arrival are located inside the actual clearance. In this way, the execution section 22 determines the possibility or the impossibility of the slip-by travel of the lean vehicle 100 through the actual clearance or the safety of such slip-by travel.

For example, in the case where the actual clearance information is the information indicating that the width of the actual clearance is less than the width W of the reference clearance S in the reference clearance information, the execution section 22 executes the driving assistance operation to forcibly reduce the target speed in the cruise control operation or the adaptive cruise control operation, which is executed in the lean vehicle 100. For such a determination, the position information of the actual clearance and the position information of the reference clearance S in the reference clearance information (for example, the position of the lateral center C, the position of the right boundary Br, the position of the left boundary Bl, and the like) are preferably taken into consideration. For example, based on the presumption that the lean vehicle 100 arrives at the actual clearance along the estimated traveling path, the execution section 22 predicts whether the right boundary Br and the left boundary Bl at the time point of the arrival are located inside the actual clearance. In this way, the execution section 22 determines the possibility or the impossibility of the slip-by travel of the lean vehicle 100 through the actual clearance or the safety of such slip-by travel.

Operation of Rider Assistance System

An operation of the rider assistance system according to one embodiment will be described hereafter.

Figure 10:
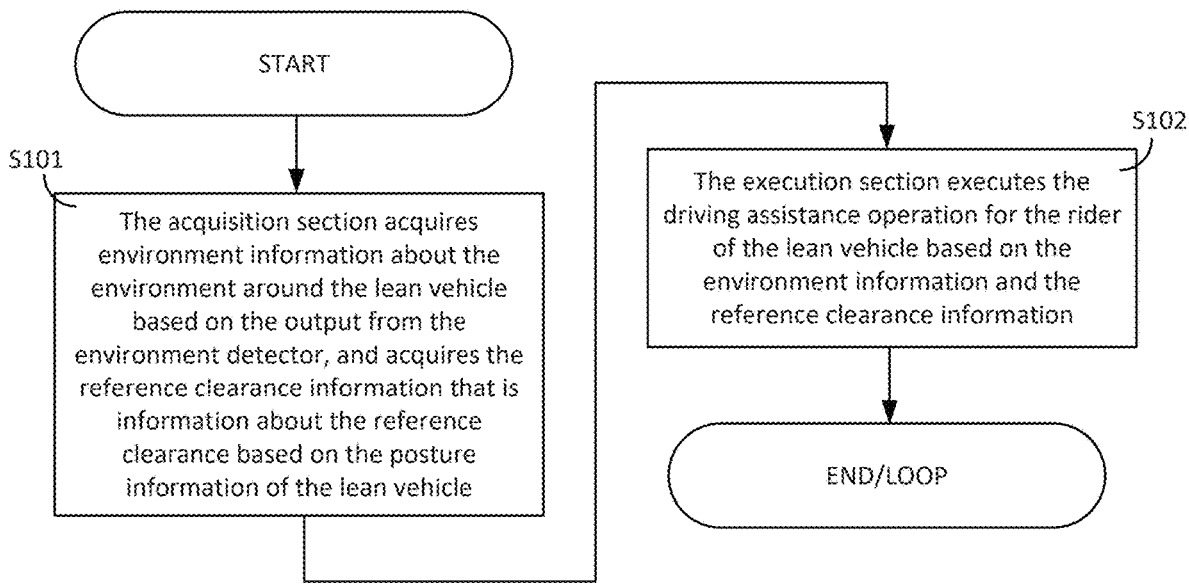
FIG. 10 is a flowchart showing an example of an operation flow of a controller in the rider assistance system according to one embodiment.

FIG. 10 is a chart illustrating an example of an operation flow of the controller in the rider assistance system according to the embodiment of the present disclosure. Each processing in step S101 may be executed in separate steps, or another step may appropriately be added.

The controller 20 repeatedly executes the operation flow illustrated in FIG. 10 during the travel of the lean vehicle 100.

(Acquisition Step)

In step S101, the acquisition section 21 acquires the environment information about environment around the lean vehicle 100 based on the output from the environment detector 11, which is mounted to the lean vehicle 100, or via the wireless communication with the other vehicle or the infrastructure equipment. In addition, the acquisition section 21 acquires the reference clearance information that is information about the reference clearance S based on the posture information of the lean vehicle 100. The reference clearance S is used as a reference in a determination whether the clearance allows the lean vehicle 100 to pass through or a determination whether it is safe for the lean vehicle 100 to pass through.

(Execution Step)

Next, in step S102, the execution section 22 executes the driving assistance operation for the rider 200 of the lean vehicle 100 based on the environment information and the reference clearance information.

Effects of Rider Assistance System

A description will be made on effects of the rider assistance system according to the embodiment.

In the rider assistance system 1, the acquisition section 21 acquires the reference clearance information, which is the information about the reference clearance S serving as the determination criterion for the possibility or the impossibility of the slip-by travel of the lean vehicle 100 or the safety of such slip-by travel, based on the posture information of the lean vehicle 100, and the execution section 22 executes the driving assistance operation based on the reference clearance information. Accordingly, it is possible to execute the driving assistance operation, for which the change in the space occupied by the travel of the lean vehicle 100 according to the travel posture is taken into consideration. Therefore, it is possible to appropriately assist the rider 200 in driving the lean vehicle 100.

Preferably, the acquisition section 21 changes the width W of the reference clearance S based on the posture information of the lean vehicle 100. With such a configuration, it is possible to appropriately reflect the change in the space occupied by the travel of the lean vehicle 100 according to the travel posture to the driving assistance operation.

Preferably, the acquisition section 21 changes the lateral center C of the reference clearance S based on the posture information of the lean vehicle 100. With such a configuration, it is possible to appropriately reflect the change in the space occupied by the travel of the lean vehicle 100 according to the travel posture to the driving assistance operation.

Preferably, the acquisition section 21 acquires the reference clearance information based on the dimensional information of the protrusion 101 of the lean vehicle 100. With such a configuration, it is possible to appropriately reflect the change in the space occupied by the travel of the lean vehicle 100 according to the travel posture to the driving assistance operation.

Preferably, the acquisition section 21 acquires the reference clearance information based on the occupant information of the lean vehicle 100. With such a configuration, it is possible to appropriately reflect the change in the space occupied by the travel of the lean vehicle 100 according to the travel posture to the driving assistance operation.

Preferably, the acquisition section 21 acquires the reference clearance information based on the load information of the lean vehicle 100. With such a configuration, it is possible to appropriately reflect the change in the space occupied by the travel of the lean vehicle 100 according to the travel posture to the driving assistance operation.

Preferably, in regard to the reference clearance information, the width W of the reference clearance S varies depending on a height. According to such a configuration, even if the lean vehicle 100 changes its posture while traveling and the change in the posture results in a change in the space occupied by the lean vehicle 100, the change in the space can be appropriately reflected to the driving assistance operation.

Preferably, in regard to the reference clearance information, the lateral center C of the reference clearance S varies depending on a height. According to such a configuration, even if the lean vehicle 100 changes its posture while traveling and the change in the posture results in a change in the space occupied by the lean vehicle 100, the change in the space can be appropriately reflected to the driving assistance operation.

Preferably, the driving assistance operation is the adaptive cruise control operation of the lean vehicle 100, and the execution section 22 determines the target vehicle for the speed control in the adaptive cruise control operation based on the reference clearance information. With such a configuration, the target vehicle in the adaptive cruise control operation is appropriately determined. Therefore, it is possible to appropriately assist the rider 200 in driving the lean vehicle 100.

Preferably, the execution section 22 determines the possibility or the impossibility of the slip-by travel of the lean vehicle 100 through the actual clearance or the safety of such slip-by travel based on the reference clearance information and the actual clearance information, which is the information about the actual clearance located on the traveling path of the lean vehicle 100. Then, the execution section 22 executes the driving assistance operation based on the determination result. With such a configuration, it is possible to further appropriately determine the possibility or the impossibility of the slip-by travel through the actual clearance or the safety of such slip-by travel. Therefore, it is possible to appropriately assist the rider 200 in driving the lean vehicle 100.

The embodiment of the present disclosure is not limited to that in the above description. That is, the present disclosure includes modes in each of which the embodiment that has been described so far is modified. In addition, the present disclosure includes a mode in which the embodiment that has been described so far is only partially implemented or a mode in which the parts of the embodiment are combined.

For example, the above description has been made on the case where, when the travel of the lean vehicle 100 in the upright posture is changed to the lean travel, in the reference clearance information, both of the right boundary Br and the left boundary Bl of the reference clearance S are shifted. However, when the travel of the lean vehicle 100 in the upright posture is changed to the lean travel, in the reference clearance information, only one of the right boundary Br and the left boundary Bl of the reference clearance S may be shifted. In addition, in the reference clearance information, the displacement amount may be limited such that, of the right boundary Br and the left boundary Bl of the reference clearance S, the boundary on an opposite side of the leaning direction of the lean vehicle 100 does not get too close to the lean vehicle 100 when the lean vehicle 100 makes the lean travel.

LIST OF REFERENCE NUMBERS

1: Rider assistance system
11: Environment detector
12: Communication device
13: Travel state detector
20: Controller
21: Acquisition section
22: Execution section
30: Brake system
40: Drive system
50: Notification device 60: Worn article
100: Lean vehicle
101: Protrusion
102: Loaded article
200: Rider
S: Reference clearance
Br: Right boundary
Bl: Left boundary
W: Width of reference clearance
Wo: Effective vehicle width
Mr: Right margin
Ml: Left margin
C: Lateral center of reference clearance
R: Reference point
D: Displacement amount

The invention claimed is:

1. A controller (20) for a rider assistance system (1) that assists a rider (200) of a lean vehicle (100) in driving the lean vehicle (100), the controller:
    configured to acquire an environment information about an environment around the lean vehicle (100), in response to an output from an environment detector (11) mounted to the lean vehicle (100) or via a wireless communication with another vehicle or an infrastructure equipment; and
    execute a driving assistance operation for the rider (200) according to the environment information, wherein
    the controller is configured to acquire a reference clearance information by using a posture information that is information about a posture of the lean vehicle (100), wherein the reference clearance information is information about a reference clearance(S) that is a reference used in a determination whether there is a space through which the lean vehicle (100) slips or a determination whether it is safe for the lean vehicle (100) to slip through, and
    the controller configured to execute the driving assistance operation based on the reference clearance information.

2. The controller according to claim 1, wherein the controller is further configured to change a width (W) of the reference clearance(S) based on the posture information about the lean vehicle (100).

3. The controller according to claim 1, wherein the controller is further configured to change a lateral center (C) of the reference clearance(S) based on the posture information of the lean vehicle (100).

4. The controller according to claim 1, wherein the controller is further configured to acquire the reference clearance information based on a dimensional information that is information about a dimension of a protrusion (101) protruding from the lean vehicle (100) laterally.

5. The controller according to claim 1, wherein the controller is further configured to acquire the reference clearance information based on an occupant information that is information about an occupant of the lean vehicle (100).

6. The controller according to claim 1, wherein the controller is further configured to acquire the reference clearance information based on a load information that is information about a loading article on the lean vehicle (100).

7. The controller according to claim 1, wherein a width (W) of the reference clearance(S) varies depending on a height.

8. The controller according to claim 1, wherein a lateral center (C) of the reference clearance(S) varies depending on a height.

9. The controller according to claim 1, wherein the controller is further configured to acquire the reference clearance information based on information about a roll angle that is generated to the lean vehicle (100) while traveling.

10. The controller according to claim 1, wherein the controller is further configured to acquire the reference clearance information based on information about a steering angle that is generated to the lean vehicle (100) while traveling.

11. The controller according to claim 1, wherein the controller is further configured to acquire the reference clearance information based on information about a yaw rate that is generated to the lean vehicle (100) while traveling.

12. The controller according to claim 1, wherein the driving assistance operation is an adaptive cruise control operation of the lean vehicle (100), and the controller is further configured to set a target vehicle based on the reference clearance information for a speed control in the adaptive cruise control operation.

13. The controller according to claim 1, wherein the controller is further configured to:
    receive an actual clearance information that is information about an actual clearance located in a traveling path of the lean vehicle (100);
    determine, based on the reference clearance information and the actual clearance information, whether the actual clearance allows the lean vehicle (100) to slip therethrough or whether it is safe for the lean vehicle (100) to slip through the actual clearance; and
    executes the driving assistance operation based on a result of the determination.

14. A control method for a rider assistance system (1) that assists a rider (200) of a lean vehicle (100) in driving the lean vehicle (100), the control method comprising:
    acquiring (S101), via a controller, an environment information about an environment around the lean vehicle (100) in response to an output from an environment detector (11) mounted to the lean vehicle (100) or via a wireless communication with another vehicle or an infrastructure equipment; and
    executing (S102), via the controller, a driving assistance operation for the rider (200) according to the environment information, wherein
    in acquiring (S101) the environment information, the controller acquires a reference clearance information by using a posture information that is information about a posture of the lean vehicle (100), the reference clearance information is information about a reference clearance(S) that is a reference used in a determination whether there is a space through which the lean vehicle (100) slips or a determination whether it is safe for the lean vehicle (100) to slip through, and
    in executing (S102) the driving assistance operation, the controller executes the driving assistance operation based on the reference clearance information.

* * * * *